US008886416B2

(12) United States Patent
Fukano et al.

(10) Patent No.: US 8,886,416 B2
(45) Date of Patent: Nov. 11, 2014

(54) HYDRAULIC SHOVEL OPERABILITY RANGE DISPLAY DEVICE AND METHOD FOR CONTROLLING SAME

(75) Inventors: Ryo Fukano, Yokohama (JP); Hisashi Asada, Yokohama (JP); Takashi Kurihara, Hirakata (JP)

(73) Assignee: Komatsu Ltd., Tokyo (JP)

( * ) Notice: Subject to any disclaimer, the term of this patent is extended or adjusted under 35 U.S.C. 154(b) by 129 days.

(21) Appl. No.: 13/819,225

(22) PCT Filed: Feb. 8, 2012

(86) PCT No.: PCT/JP2012/052830
§ 371 (c)(1),
(2), (4) Date: Feb. 26, 2013

(87) PCT Pub. No.: WO2012/114870
PCT Pub. Date: Aug. 30, 2012

(65) Prior Publication Data
US 2013/0158784 A1 Jun. 20, 2013

(30) Foreign Application Priority Data

Feb. 22, 2011 (JP) .................. 2011-036199

(51) Int. Cl.
*E02F 9/26* (2006.01)
*E02F 9/20* (2006.01)
(52) U.S. Cl.
CPC .......... *E02F 9/26* (2013.01); *G05B 2219/45012* (2013.01); *E02F 9/262* (2013.01); *E02F 9/2037* (2013.01); *E02F 9/2033* (2013.01); *E02F 9/264* (2013.01)
USPC .......................................... 701/50

(58) Field of Classification Search
CPC ........... E02F 9/26; E02F 3/437; E02F 9/2037; E02F 9/262; E02F 9/264; E02F 3/436; E02F 3/439; E02F 3/433; G05B 2219/45012
USPC ........ 701/36, 50; 37/341, 348, 411–415, 443; 172/2, 3, 4.5, 779
See application file for complete search history.

(56) References Cited

U.S. PATENT DOCUMENTS 4,059,196 A * 11/1977 Uchino et al. ................ 414/699
4,888,890 A * 12/1989 Studebaker et al. ............ 37/348

(Continued)

FOREIGN PATENT DOCUMENTS

| JP | 2-30521 Y2 | 8/1990 |
| JP | 2-225729 A | 9/1990 |

(Continued)

OTHER PUBLICATIONS

International Search Report of corresponding PCT Application No. PCT/JP2012/052830.

*Primary Examiner* — Jason Holloway
(74) *Attorney, Agent, or Firm* — Global IP Counselors, LLP

(57) ABSTRACT

In a hydraulic shovel operability range display device, a calculation unit is configured to set a boundary between an operability range and an underbody area along a vertical direction in a global coordinate system when a vehicle body is horizontally oriented. When the vehicle body is tilted forward, the calculation unit is configured to set the boundary so as to be maintained along the vertical direction in the global coordinate system. When the vehicle body is tilted backwards, the calculation unit is configured to correct the boundary between the operability range and the underbody area so that an angle formed by the boundary and the ground surface on which the vehicle body is positioned is at least 90°.

2 Claims, 15 Drawing Sheets

(56) References Cited

U.S. PATENT DOCUMENTS

| | | | |
|---|---|---|---|
| 5,713,144 A * | 2/1998 | Haraoka | 37/348 |
| 6,732,458 B2 * | 5/2004 | Kurenuma et al. | 37/348 |
| 7,975,410 B2 * | 7/2011 | Faivre et al. | 37/348 |
| 8,509,999 B2 * | 8/2013 | Suzuki et al. | 701/50 |
| 2012/0024146 A1 * | 2/2012 | Saito | 91/525 |
| 2013/0345939 A1 * | 12/2013 | Magaki et al. | 701/50 |

FOREIGN PATENT DOCUMENTS

| | | |
|---|---|---|
| JP | 2001-32331 A | 2/2001 |
| JP | 2001-98585 A | 4/2001 |
| WO | 01/25549 A1 | 4/2001 |

* cited by examiner

HYDRAULIC SHOVEL OPERABILITY RANGE DISPLAY DEVICE AND METHOD FOR CONTROLLING SAME

CROSS-REFERENCE TO RELATED APPLICATIONS

This application claims priority to Japanese Patent Application No. 2011-036199 filed on Feb. 22, 2011, the disclosure of which is hereby incorporated herein by reference in its entirety.

TECHNICAL FIELD

The present invention relates to a hydraulic shovel operability range display device and a method for controlling same.

BACKGROUND ART

Conventionally, an operability range display device for displaying the range that a work machine is capable of reaching is known. For example, Japanese Laid-open Patent Application Publication 2001-98585 discloses a digging work guidance device. The guidance device displays a side view of a hydraulic shovel and a cross section of a design land shape constituting a work object on a screen. An operability range showing the range of motion of a bucket is also displayed on the screen.

Meanwhile, Japanese Laid-open Utility Model Application Publication H2-30521 discloses a safety device for a digging construction machine. This safety device, like the guidance device disclosed in Japanese Laid-open Patent Application Publication 2001-98585, calculates the operability range of a bucket. The area beneath a track is calculated as a warning area in which intrusion of the tip of the bucket is prohibited. When the bucket intrudes into the warning area, a warning is sounded, and a hydraulic cylinder is controlled so that the work machine stops.

SUMMARY

In the safety device disclosed in Japanese Laid-open Utility Model Application Publication H2-30521, the boundary between the operability range and the warning area is displayed as a straight line extending in the perpendicular direction of the vehicle. In the safety device, the operability range is unambiguously determined using the hydraulic shovel as a reference. Specifically, the operability range is calculated in a main vehicle body coordinate system based on the hydraulic shovel. Thus, the warning area is also calculated in the main vehicle body coordinate system. Therefore, when the vehicle body is tilted forward, as shown in FIG. 15, a boundary inclined at an angle similar to the angle at which the vehicle body is inclined is calculated. In such cases, a part 300 of an underbody area is included in an operability range 200.

An object of the present invention is to provide a hydraulic shovel operability range display device capable of displaying an appropriate operability range even when the orientation of the vehicle body is tilted.

A hydraulic shovel operability range display device according to a first aspect of the present invention is an operability range display device in a hydraulic shovel having a work machine and a vehicle body, and provided with a calculation unit and a display unit. The calculation unit calculates an operability range in which an underbody area is excluded from a reachable range. The reachable range indicates a range that can be reached by the work machine. The underbody area is the area underneath the vehicle body. The display unit displays the operability range. When the vehicle body is horizontally oriented, the calculation unit sets the boundary between the operability range and the underbody area to the vertical direction in a global coordinate system. When the vehicle body is tilted forward, the calculation unit sets the boundary between the operability range and the underbody area so as to be maintained along the vertical direction in the global coordinate system. When the vehicle body is tilted backwards, the calculation unit corrects the boundary between the operability range and the underbody area so that the angle formed by the boundary and the ground surface on which the vehicle body is positioned is at least 90°.

A method for controlling a hydraulic shovel operability range display device according to a second aspect of the present invention is a method for controlling an operability range display device in a hydraulic shovel having a work machine and a vehicle body, the method comprising the following steps. In the first step, an operability range in which the underbody area positioned underneath the vehicle body is excluded from a reachable range indicating a range that can be reached by the work machine is calculated. In the second step, the operability range is displayed. When the vehicle body is horizontally oriented, the boundary between the operability range and the underbody area is set to the vertical direction in a global coordinate system in the step of calculating the operability range. When the vehicle body is tilted forward, the boundary between the operability range and the underbody area is set so as to be maintained along the vertical direction in the global coordinate system in the step of calculating the operability range. When the vehicle body is tilted backwards, the boundary between the operability range and the underbody area is corrected in the step of calculating the operability range so that the angle formed by the boundary and the ground surface on which the vehicle body is positioned is at least 90°.

In the hydraulic shovel operability range display device according to the first aspect of the present invention, the boundary between the operability range and the underbody area is set along the vertical direction in the global coordinate system when the vehicle body is horizontally oriented. The boundary is also set so as to be maintained along the vertical direction in the global coordinate system when the vehicle body is tilted forward. Thus, the underbody area can be kept from being included in the operability range even when the vehicle body is tilted forward. Meanwhile, suppose the boundary is set so as to be maintained along the vertical direction in the global coordinate system in cases in which the vehicle is tilted backward, the angle formed by the boundary and the ground surface on which the vehicle body is positioned would be an acute angle. When digging is performed according to such operability range, the tip of the dug ground surface is liable to crumble. Thus, in the present invention, the boundary between the operability range and the underbody area is corrected so that the angle formed by the boundary and the ground surface on which the vehicle body is positioned is at least 90° when the vehicle body is tilted backwards. This keeps the tip of the dug ground surface from forming an acute angle. As described above, the present invention allows an appropriate operability range to be displayed even when the orientation of the vehicle body is tilted.

In the method for controlling a hydraulic shovel operability range display device according to the second aspect of the present invention, the boundary between the operability range and the underbody area is set along the vertical direction in the global coordinate system when the vehicle body is horizontally oriented. The boundary is also set so as to be maintained along the vertical direction in the global coordinate system when the vehicle body is tilted forward. Thus, the underbody area can be kept from being included in the operability range even when the vehicle body) is tilted forward. Meanwhile, suppose the boundary is set so as to be maintained along the vertical direction in the global coordinate system when the vehicle is tilted backward, the angle formed by the boundary and the ground surface on which the vehicle body would be an acute angle. When digging is performed according to such operability range, the tip of the dug ground surface is liable to crumble. Thus, in the present invention, the boundary between the operability range and the underbody area is corrected so that the angle formed by the boundary and the ground surface on which the vehicle body is positioned is at least 90° when the vehicle body is tilted backwards. This keeps the tip of the dug ground surface from forming an acute angle. As described above, the present invention allows an appropriate operability range to be displayed even when the orientation of the vehicle body is tilted.

DETAILED DESCRIPTION OF EMBODIMENTS

1. Configuration 1-1. Overall Configuration of Hydraulic Shovel

Figure 1:
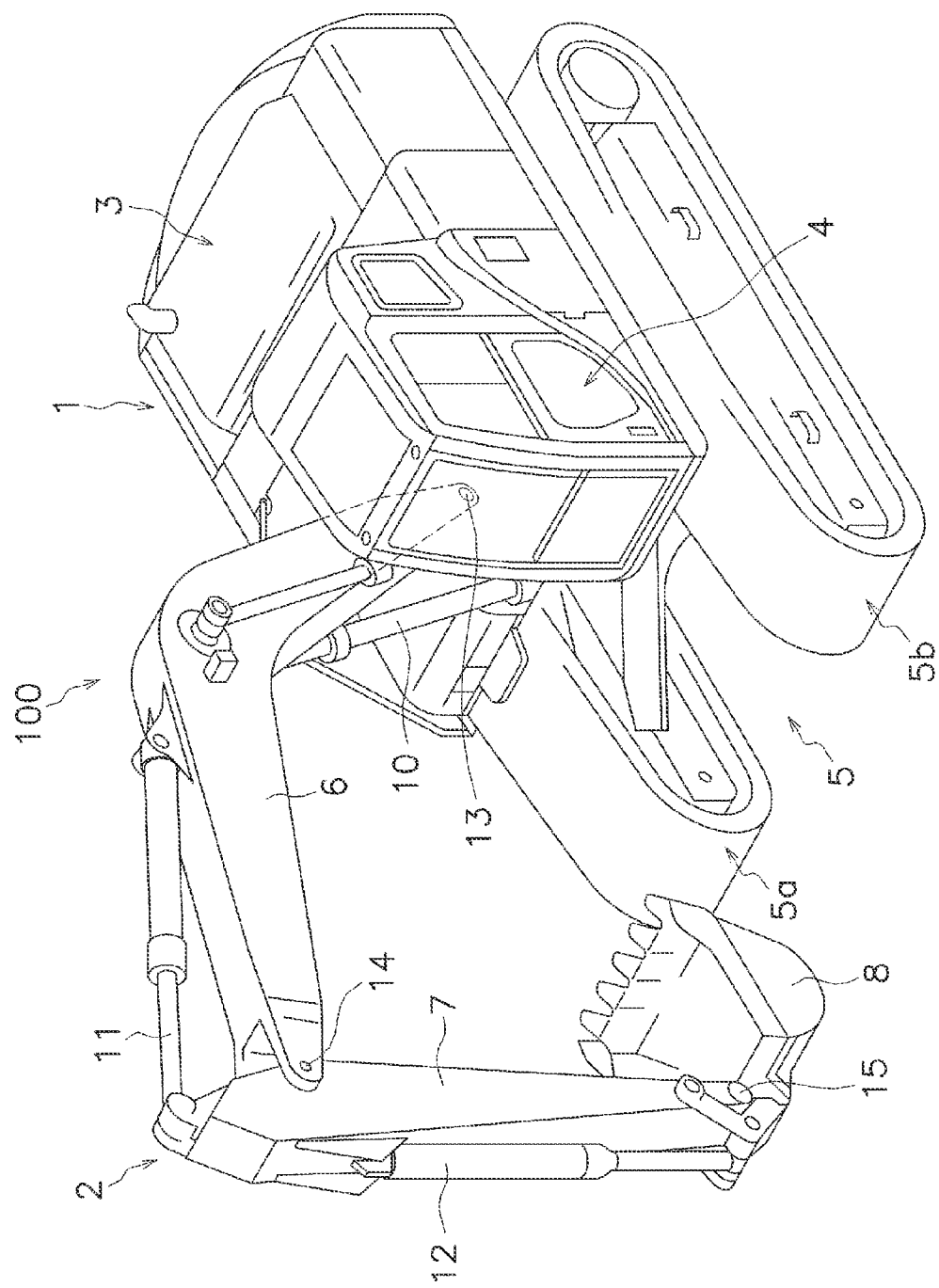
FIG. 1 is a perspective view of a hydraulic shovel.

There follows a description of a hydraulic shovel operability range display device according to an embodiment of the present invention with reference to the drawings. FIG 1 is a perspective view of a hydraulic shovel 100 in which an operability range display device is installed. The hydraulic shovel 100 has a main vehicle body 1 and a work machine 2. The main vehicle body 1 has an upper pivoting body 3, a cab 4, and a travel unit 5. The upper pivoting body 3 includes devices, such as an engine, a hydraulic pump, and the like, which are not shown in the drawings. The cab 4 is installed on the front of the upper pivoting body 3. A display input device 38 and an operating device 25 described below are disposed within the cab 4 (cf. FIG. 3). The travel unit 5 has tracks 5a, 5b, and the rotation of the tracks 5a, 5b causes the hydraulic shovel 100 to travel.

The work machine 2 is attached to the front of the main vehicle body 1; and has a boom 6, an arm 7, a bucket 8, a boom cylinder 10, an arm cylinder 11, and a bucket cylinder 12. The base end of the boom 6 is pivotally attached to the front of the main vehicle body 1 with a boom pin 13 disposed therebetween. The base end of the arm 7 is pivotally attached to the tip of the boom 6 with an arm pin 14 disposed therebetween. The tip of the arm 7 is pivotally attached to the bucket 8 with a bucket pin 15 disposed therebetween.

Figure 2:
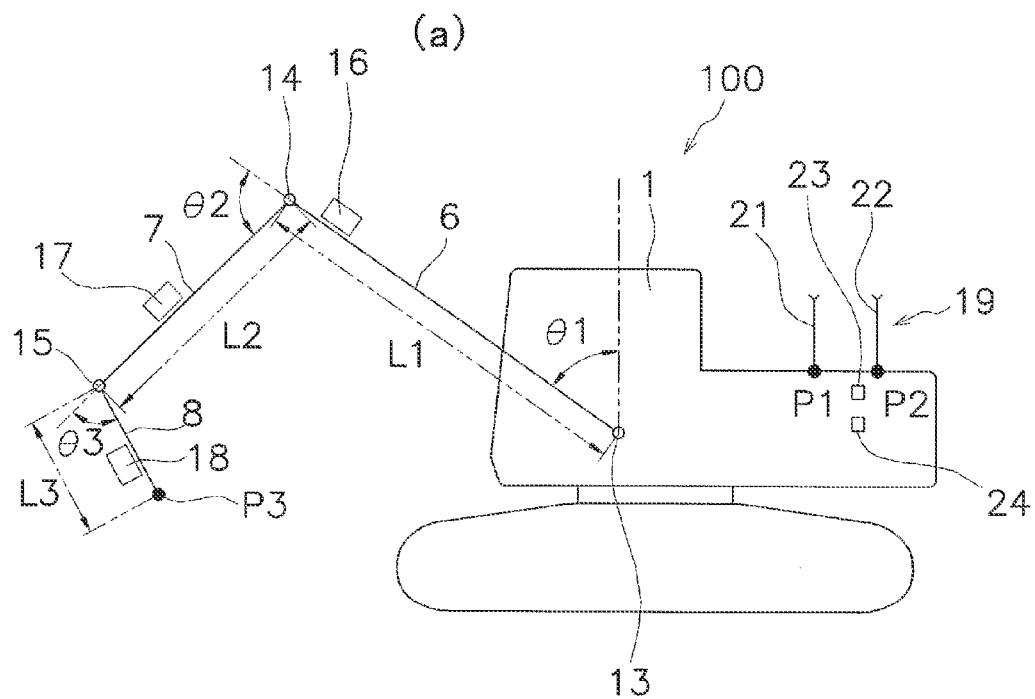
FIG. 2 is a schematic illustration of the configuration of the hydraulic shovel.
Figure 2:
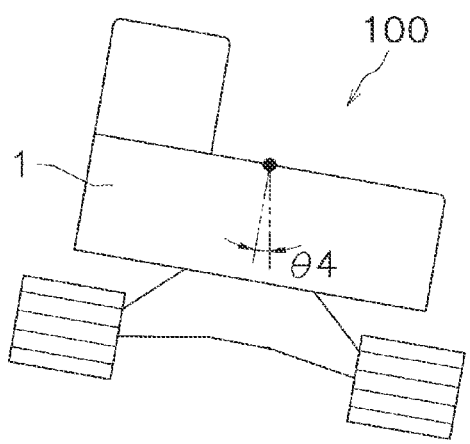

FIG. 2 is a schematic illustration of the configuration of the hydraulic shovel 100. FIG. 2(a) is a side view of the hydraulic shovel 100, and FIG. 2(b) is a rear view of the hydraulic shovel 100. As shown in FIG. 2(a), L1 is the length of the boom 6, i.e., the length from the boom pin 13 to the arm pin 14, L2 is the length of the arm 7, i.e., the length from the arm pin 14 to the bucket pin 15. 1.3 is the length of the bucket 8, i.e., the length from the bucket pin 15 to the tip of a tooth of the bucket 8.

The boom cylinder 10, arm cylinder 11, and bucket cylinder 12 shown in FIG. 1 are hydraulic cylinders, each of which is driven by hydraulic pressure. The boom cylinder 10 drives the boom 6. The arm cylinder 11 drives the arm 7. The bucket cylinder 12 drives the bucket 8. A proportional control valve 37 (cf. FIG. 3) is disposed between a hydraulic pump not shown in the drawings and the hydraulic cylinders of the boom cylinder 10, arm cylinder 11, bucket cylinder 12, and the like. The proportional control valve 37 is controlled by a work machine controller 26 described below, whereby the flow rate of hydraulic oil supplied to the hydraulic cylinders 10 to 12 is controlled. In this way, the movements of the hydraulic cylinders 10 to 12 are controlled.

As shown in FIG. 2(a), the boom 6, arm 7, and bucket 8 are provided with first through third stroke sensors 16 to 18, respectively. The first stroke sensor 16 detects the stroke length of the boom cylinder 10. A display controller 39 (cf. FIG. 3) described below calculates an angle of inclination (hereafter, "boom angle") $\theta 1$ of the boom 6 with respect to an axis Za (cf. FIG. 6) of a main vehicle body coordinate system described below using the stroke length of the boom cylinder 10 detected by the first stroke sensor 16. The second stroke sensor 17 detects the stroke length of the arm cylinder 11. The display controller 39 calculates an angle of inclination (hereafter, "arm angle") $\theta 2$ of the arm 7 with respect to the boom 6 using the stroke length of the arm cylinder 11 detected by the second stroke sensor 17. The third stroke sensor 18 detects the stroke length of the bucket cylinder 12. The display controller 39 calculates an angle of inclination (hereafter, "bucket angle") $\theta 3$ of the bucket 8 with respect to the arm 7 using the stroke length of the bucket cylinder 12 detected by the third stroke sensor 18.

Figure 3:
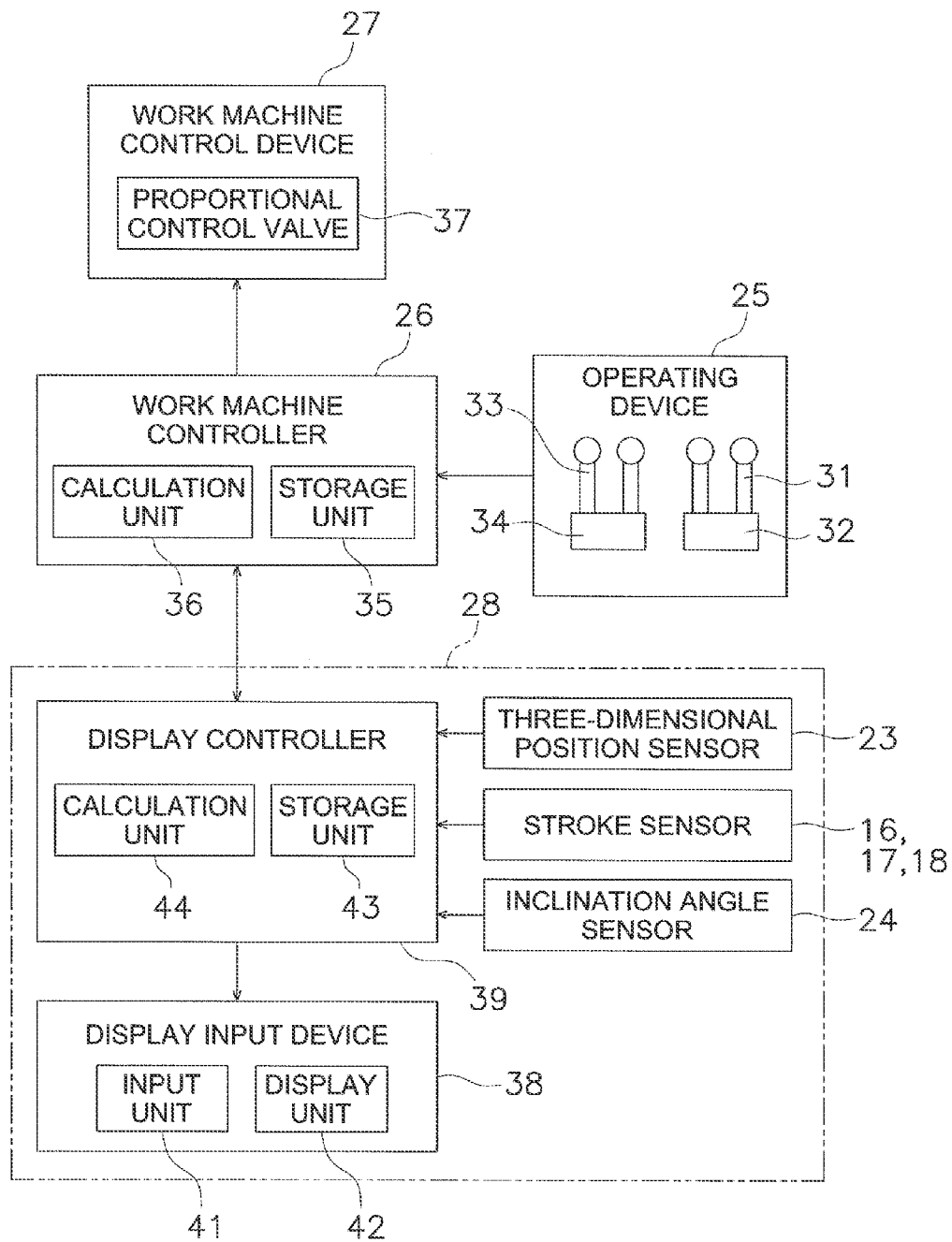
FIG. 3 is a block diagram showing the configuration of a control system which a hydraulic shovel comprises.

The main vehicle body 1 is provided with a position detector unit 19. The position detector unit 19 detects the current position of the hydraulic shovel 100. The position detector unit 19 has two Real Time Kinematic Global Navigation Satellite System (RTK-GNSS) antennas 21, 22 (hereafter, "GNSS antennas 21, 22"), a three-dimensional position sensor 23, and an inclination angle sensor 24. The GNSS antennas 21, 22 are disposed at a fixed interval along a Ya axis (cf. FIG. 6) of a main vehicle body coordinate system Xa-Ya-Za described below. Signals corresponding to GNSS radio waves received by the GNSS antennas 21, 22 are inputted to the three-dimensional position sensor 23. The three-dimensional position sensor 23 detects mounting positions P1, P2 of the GNSS antennas 21, 22. As shown in FIG. 2(b), the inclination angle sensor 24 detects an angle of inclination θ4 (hereafter, "roll angle θ4") of the widthwise direction of the main vehicle body 1 with respect to the direction of gravity, i.e., the vertical direction in the global coordinate system (cf. FIG. 6(b)). The inclination angle sensor 24 also detects an angle of inclination θ5 (hereafter, "pitch angle θ5") of the front-back direction of the main vehicle body 1 with respect to the vertical direction of in the global coordinate system (cf. FIG. 12), FIG. 3 is a block diagram of the configuration of a control system which the hydraulic shovel 100 comprises. The hydraulic shovel 100 comprises the operating device 25, the work machine controller 26, a work machine control device 27, and an operability range display device 28. The operating device 25 has a work machine operating member 31, a work machine operation detector unit 32, a travel operating member 33, and a travel operation detector unit 34. The work machine operating member 31 is a member for allowing an operator to operate the work machine 2, and is, for example, an operating lever. The work machine operation detector unit 32 detects the details of the operation inputted by using the work machine operating member 31, and sends the details to the work machine controller 26 as a detection signal. The travel operating member 33 is a member for allowing an operator to operate the traveling of the hydraulic shovel 100, and is, for example, an operating lever. The travel operation detector unit 34 detects the details of the operation inputted by using the travel operating member 33, and sends the details to the work machine controller 26 as a detection signal.

The work machine controller 26 has a storage unit 35 such as a RAM or ROM, and a calculation unit 36 such as a CPU, The work machine controller 26 primarily controls the work machine 2. The work machine controller 26 generates a control signal for causing the work machine 2 to act according to the operation of the work machine operating member 31, and outputs the signal to the work machine control device 27. The work machine control device 27 has the proportional control valve 37, and the proportional control valve 37 is controlled based on the control signal from the work machine controller 26. Hydraulic oil is drained from the proportional control valve 37 at a flow rate corresponding to the control signal from the work machine controller 26, and is supplied to the hydraulic cylinders 10 to 12. The hydraulic cylinders 10 to 12 are driven according to the hydraulic oil supplied from the proportional control valve 37. This causes the work machine 2 to act.

1-2. Configuration of Operability Range Display Device 28

The operability range display device 28 is a device for displaying an operability range 76 of the hydraulic shovel 2 shown in a guidance picture. The guidance picture is a picture for guiding the hydraulic shovel 100 to a target work object within a work area. Along with the first through third stroke sensors 16 to 18, the three-dimensional position sensor 23, and the inclination angle sensor 24 described above, the operability range display device 28 has the display input device 38 and the display controller 39.

The display input device 38 has an input unit 41 like a touch panel, and a display unit 42 such as an LCD. The display input device 38 displays a guidance picture for guiding the hydraulic shovel 100 to a target work object within a work area. A variety of keys are displayed on the guidance picture. An operator can execute the various functions of the operability range display device 28 by touching the various keys in the guidance picture. The guidance picture will be described in detail later.

Figure 4:
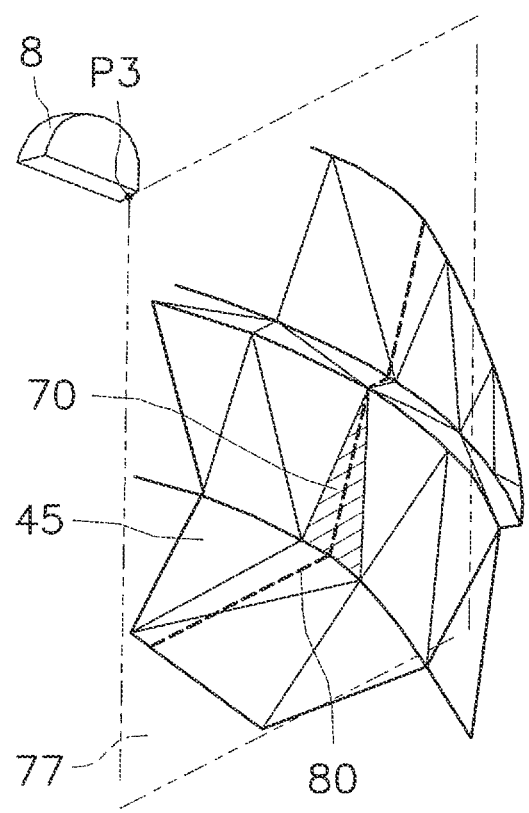
FIG. 4 is an illustration of a design land shape indicated by design land shape data.

The display controller 39 executes the various functions of the operability range display device 28. The display controller 39 has a storage unit 43 such as a RAM or ROM, and a calculation unit 44 such as a CPU. The storage unit 43 stores work machine data. The work machine data comprises the length L1 of the boom 6, the length L2 of the arm 7, and the length L3 of the bucket 8 described above. The work machine data also comprises minimum values and maximum values for each of the boom angle θ1, the arm angle θ2, and the bucket angle θ3. The display controller 39 and the work machine controller 26 are capable of communicating with each other via wired or wireless communication means. Design land shape data indicating the shape and position of a three-dimensional design topography in a work area is created in advance and stored in the storage unit 43 of the display controller 39. The display controller 39 displays a guidance picture on the display input device 38 on the basis of data such as the design land shape data and the results detected by the variety of sensors described above. Specifically, as shown in FIG. 4, the design land shape includes a plurality of design surfaces 45, each of which is represented using a triangular polygon. In FIG. 4, only one of the plurality of design surfaces is labeled 45, while labels for the other design surfaces are omitted. The target work object is one or a plurality of design surfaces among the design surfaces 45. The operator selects one or a plurality of design surfaces among the design surfaces 45 as a target surface 70. The display controller 39 causes the display input device 38 to display a guidance picture for guiding the hydraulic shovel 100 to the target surface 70.

2. Guidance Picture

2-1. Configuration of Guidance Picture

Figure 5:
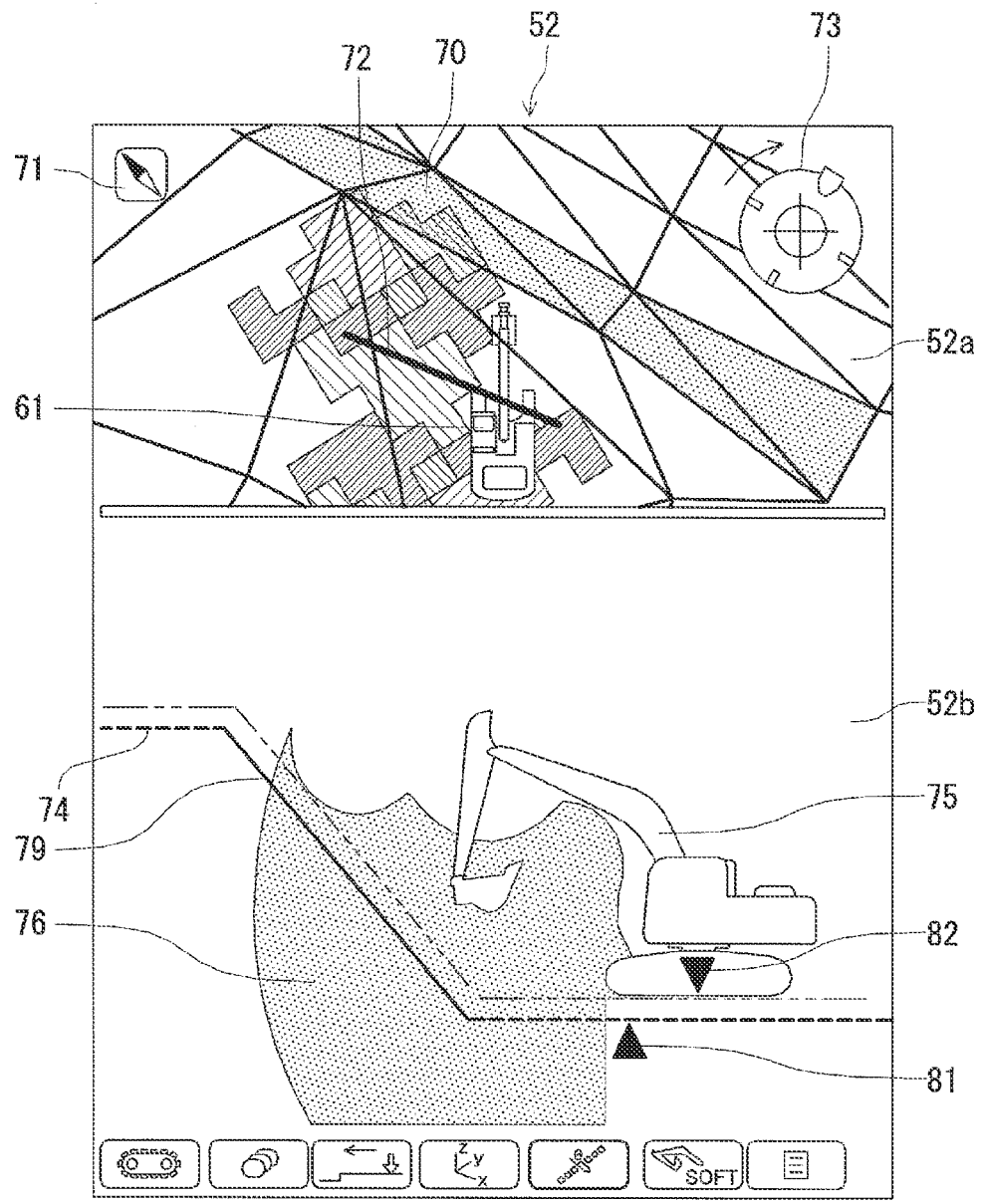
FIG. 5 is an illustration of a guidance picture.

A guidance picture 52 is shown in FIG. 5. The guidance picture 52 includes a top view 52a and a side view 52b.

The top view 52a illustrates the design land shape of the work area and the current position of the hydraulic shovel 100. The top view 52a represents the design land shape as seen from above using a plurality of triangular polygons. The target surface 70 selected as the target work object is displayed in a color different from that of the rest of the design land shape. In FIG. 5, the current position of the hydraulic shovel 100 is displayed as an icon 61 of the hydraulic shovel as seen from above, but another symbol may be displayed to indicate the current position.

In the top view 52a, information for guiding the hydraulic shovel 100 to the target surface 70 is displayed. Specifically, a directional indicator 71 is displayed. The directional indicator 71 is an icon for showing the direction of the target surface 70 with respect to the hydraulic shovel 100. The top view 52a further includes information showing a target work position and information for bringing the hydraulic shovel 100 directly face-to-face with the target surface 70. The target work position is the optimal position for the hydraulic shovel 100 to perform digging upon the target surface 70, and is calculated on the basis of the position of the target surface 70 and an operability range 76 to be described hereafter. The target work position is displayed as a straight line 72 in the top view 52a. The information for bringing the hydraulic shovel 100 directly face-to-face with the target surface 70 is displayed as a facing compass 73. The facing compass 73 is an icon showing the direction directly facing the target surface 70 and the direction of the hydraulic shovel 100 to pivot in. The operator can find the degree to which the shovel faces the target surface 70 using the facing compass 73.

The side view 52b includes a design surface line 74, a target surface line 79, an icon 75 of the hydraulic shovel 100 as seen from the side, the operability range 76 of the work machine 2, and information indicating the target work position. The design surface line 74 indicates a cross section of the design surfaces 45 apart, from the target surface 70. The target surface line 79 indicates a cross section of the target surface 70. As shown in FIG. 4, the design surface line 74 and the target surface line 79 are obtained by calculating an intersection 80 of the design land shape and a plane 77 passing through a current position of the tip P3 of the bucket 8. The target surface line 79 is displayed in a color different from that of the design surface line 74. In FIG. 5, different types of lines are used to represent the design surface line 74 and the target surface line 79. The operability range 76 indicates the range of the circumference around the main vehicle body 1 in which the work machine 2 can work. The operability range 76 is calculated from the work machine data described above. The method of calculating the operability range 76 will be described in detail hereafter. The target work position shown in the side view 52b is equivalent to the target work position 52a displayed in the top view 52a described above, and is indicated by a triangular icon 81. The reference position of the hydraulic shovel 100 is indicated by a triangular icon 82. The operator moves the hydraulic shovel 100 so that the icon 82 for the reference position converges with the icon 81 for the target work position.

As described above, the guidance picture 52 includes information indicating the target work position and information for bringing the hydraulic shovel 100 directly face-to-face with the target surface 70. An operator is thereby capable of disposing the hydraulic shovel 100 in the optimal position and direction for performing work upon the target surface 70 using the guidance picture 52. Thus, the guidance picture 52 is primarily referred to in order to position the hydraulic shovel 100.

2-2 Method of Calculating Current Position of Tip of Bucket

As described above, the target surface line 79 is calculated based on the current position of the tip of the bucket 8. The display controller 39 calculates the current position of the tip P3 of the bucket 8 in a global coordinate system {X, Y, Z} based on the results detected by the three-dimensional position sensor 23, the first through third stroke sensors 16 to 18, the inclination angle sensor 24, and the like. Specifically, the current position of the tip P3 of the bucket 8 is obtained as follows.

Figure 6:
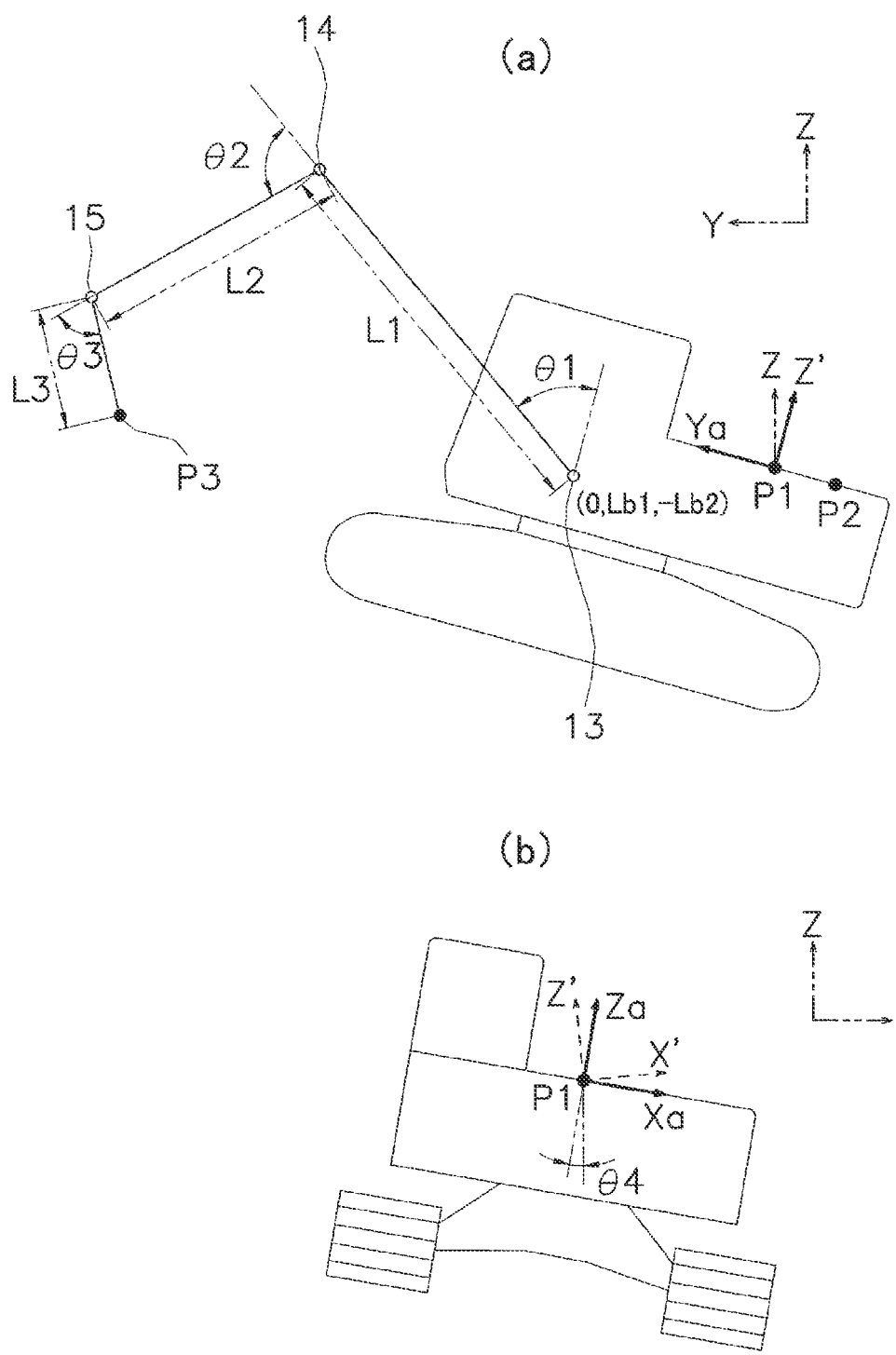
FIG. 6 shows a method of calculating the current position of the tip of a bucket.

First, as shown in FIG. 6, a main vehicle body coordinate system {Xa, Ya, Za} whose point of origin is the mounting position P1 of the GNSS antenna 21 described above is obtained. FIG. 6(a) is a side view of the hydraulic shovel 100. FIG. 6(b) is a rear view of the hydraulic shovel 100. Here, the front-back direction of the hydraulic shovel 100, i.e., the Ya axis direction of the main vehicle body coordinate system, is inclined with respect to the Y axis direction of the global coordinate system. The coordinates of the boom pin 13 in the main vehicle body coordinate system are (0, Lb1, −Lb2), and are stored in the storage unit 43 of the display controller 39 in advance, The three-dimensional position sensor 23 detects the mounting positions P1, P2 of the GNSS antennas 21, 22. A unit vector for the Ya axis direction is calculated from the detected coordinate positions P1, P2 according to the following formula (1).

$$Ya=(P1-P2)/|P1-P2| \qquad (1)$$

As shown in FIG. 6(a), introducing a vector Z' which is perpendicular to Ya and passes through the plane described by the two vectors Ya and Z, the following relationships are obtained.

$$(Z', Ya)=0 \qquad (2)$$

$$Z'=(1-c)Z+cYa \qquad (3)$$

In the above formula (3), c is a constant.
On the basis of formula (2) and (3), Z' is obtained by the following formula (4).

$$Z'=Z+\{(Z, Ya)/((Z, Ya)-1)\}(Ya-Z) \qquad (4)$$

Furthermore, define X' as a vector perpendicular to Ya and Z'. X' is obtained in the following formula (5).

$$X'=Ya \perp Z' \qquad (5)$$

As shown in FIG. 6(b), the main vehicle body coordinate system is rotated around the Ya axis by the roll angle θ4, and is thus shown as in the following formula (6).

$$[Xa \ Ya \ Za] = [X' \ Ya \ Z'] \begin{bmatrix} \cos\theta4 & 0 & \sin\theta4 \\ 0 & 1 & 0 \\ -\sin\theta4 & 0 & \cos\theta4 \end{bmatrix} \qquad (6)$$

The current angles of inclination θ1, θ2, θ3 of the boom 6, arm 7, and bucket 8, respectively as described above are calculated from the results detected by the first through third stroke sensors 16 to 18. The coordinates (xat, yat, zat) of the tip P3 of the bucket 8 in the main vehicle body coordinate system are calculated according to the following formulas (7) through (9) using the angles of inclination θ1, θ2, θ3 and the lengths L1, L2, L3 of the boom 6, the arm 7, and the bucket 8.

$$xat=0 \qquad (7)$$

$$yat=Lb1+L1\sin\theta1+L2\sin(\theta1+\theta2)+L3\sin(\theta1+\theta2\theta3) \text{ tm (8)}$$

$$zat=-Lb2+L1\cos\theta1+L2\cos(\theta1+\theta2)+L3\cos(\theta1+\theta2+\theta3) \qquad (9)$$

The tip P3 of the bucket 8 moves over the plane Ya-Za in the main vehicle body coordinate system.

The coordinates of the tip P3 of the bucket 8 in the global coordinate system are obtained according to the following formula (10).

$$P3=xat \cdot Xa+yat \cdot Ya+zat \cdot Za+P1 \qquad (10)$$

As shown in FIG. 4, the display controller 39 calculates, on the basis of the current position of the tip P3 of the bucket 8 calculated as described above and the design land shape data stored in the storage unit 43, the intersection 80 of the three-dimensional design land shape and the Ya-Za plane 77 through which the tip P3 of the bucket 8 passes. The display controller 39 displays the part of the intersection passing through the target surface 70 in the guidance picture 52 as the target surface line 79 described above.

2-3. Method of Calculating the Operability Range 76

Figure 7:
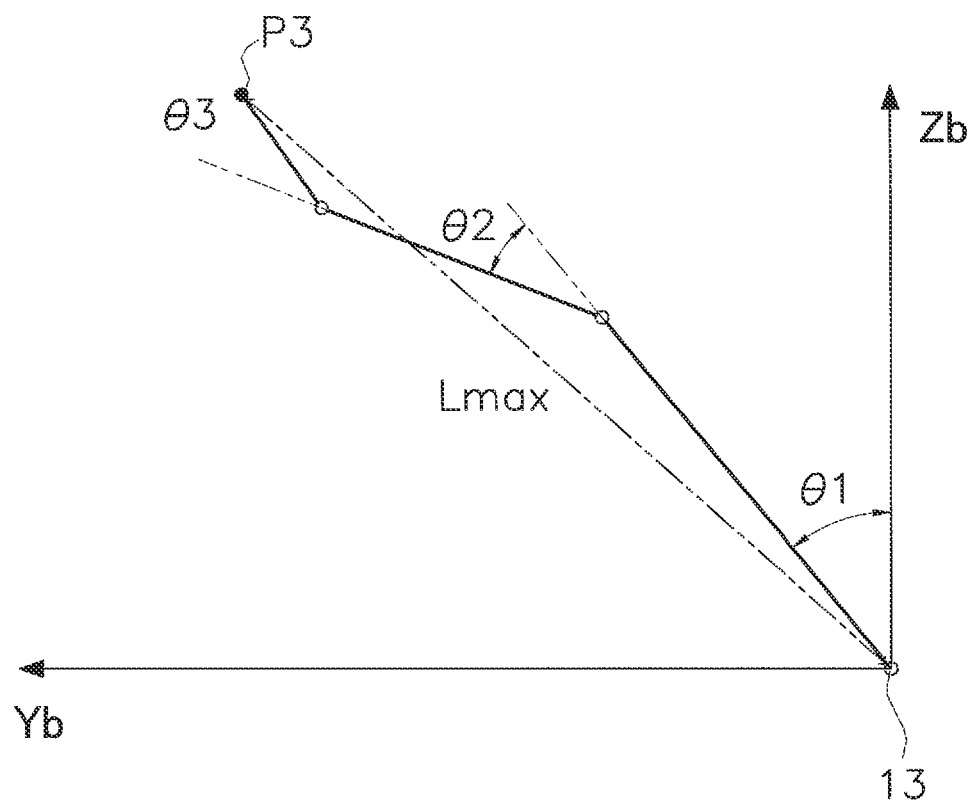
FIG. 7 is a schematic illustration of the work machine in a maximum reach posture.

First, before the method of calculating the operability range 76 is described, the maximum reach length Lmax and the minimum reach length Lmin of the work machine 2 is described. The maximum reach length Lmax is the reach length of the work machine 2 when the work machine 2 is maximally extended. The reach length of the work machine 2 is the distance between the boom pin 13 and the tip P3 of the bucket 8. FIG. 7 schematically illustrates the posture of the work machine 2 when the length of the work machine 2 is equivalent to the maximum reach length Lmax (hereafter, "maximum reach posture"). The origin of the coordinate plane Yb-Zb shown in FIG. 7 is the position of the boom pin 13 in the main vehicle body coordinate system {Xa, Ya, Za} described above. In the maximum reach posture, the arm angle $\theta 2$ is at the minimum value. The bucket angle $\theta 3$ is calculated using numerical analysis for parameter optimization so that the reach length of the work machine 2 is at the maximum. The value of the bucket angle $\theta 3$ at this time will be referred to hereafter as the "maximum reach angle".

Figure 8:
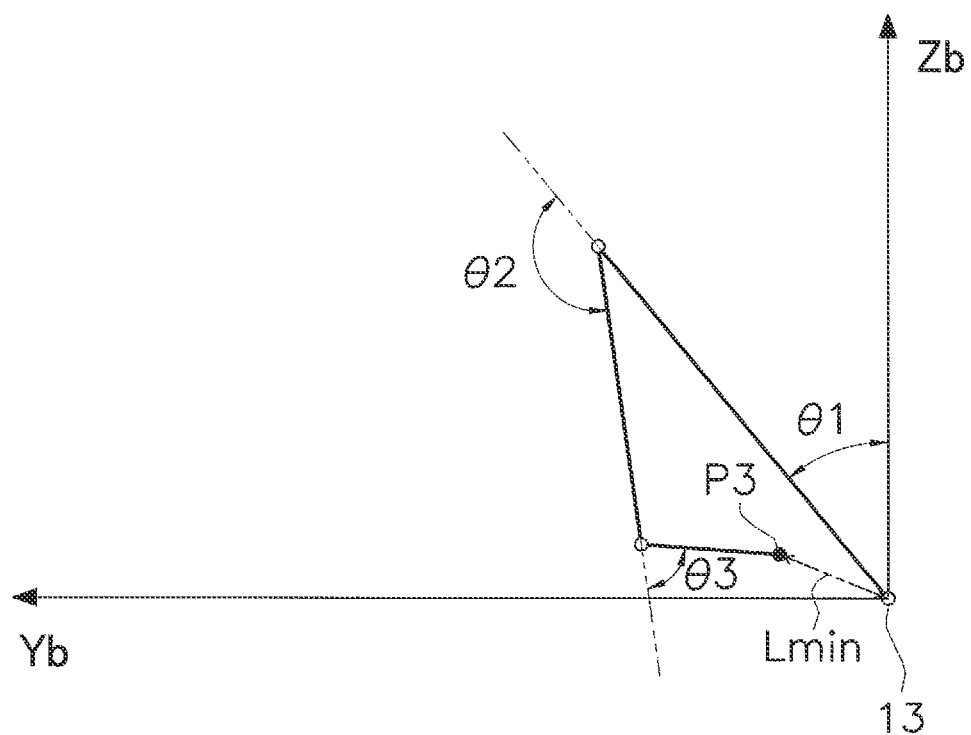
FIG. 8 is a schematic illustration of the work machine in a minimum reach posture.

The minimum reach length Lmin is the reach length of the work machine 2 when the work machine 2 is retracted to the smallest possible length. FIG. 8 schematically illustrates the posture of the machine 2 when the length of the work machine is equivalent to the minimum reach length Lmin (hereafter, "minimum reach posture"). In the minimum reach posture, the arm angle $\theta 2$ is at the maximum value. The bucket angle $\theta 3$ is calculated using numerical analysis for parameter optimization so that the reach length of the work machine 2 is at the minimum. The value of the bucket angle $\theta 3$ at this time will be referred to hereafter as the "minimum reach angle".

Figure 9:
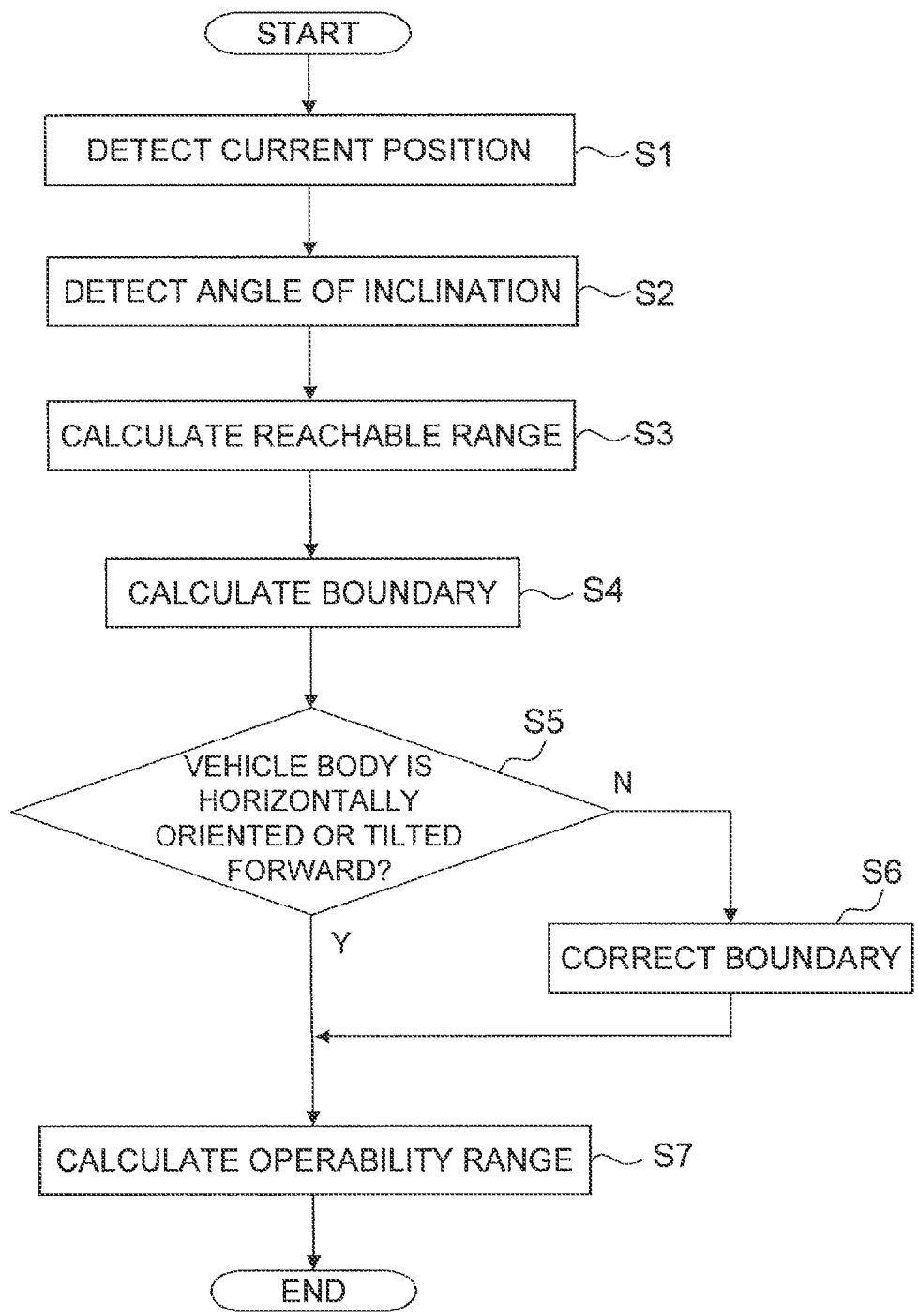
FIG. 9 is a flow chart showing a process of calculating an operability range.

Next, a flow showing the method of calculating the operability range 76 executed by the display controller 39 is shown in FIG 9. First, in step S1, the current position is detected. At this time, the current position of the main vehicle body 1 is detected by the detection signal from the position detector unit 19. The current position of the bucket pin 13 and the current position of the tip P3 of the bucket 8 are also calculated from the current position of the main vehicle body 1. In step S2, the angle of inclination is detected. At this time, the pitch angle $\theta 5$ is detected using the detection signal from the inclination angle sensor 24 described above.

Figure 10:
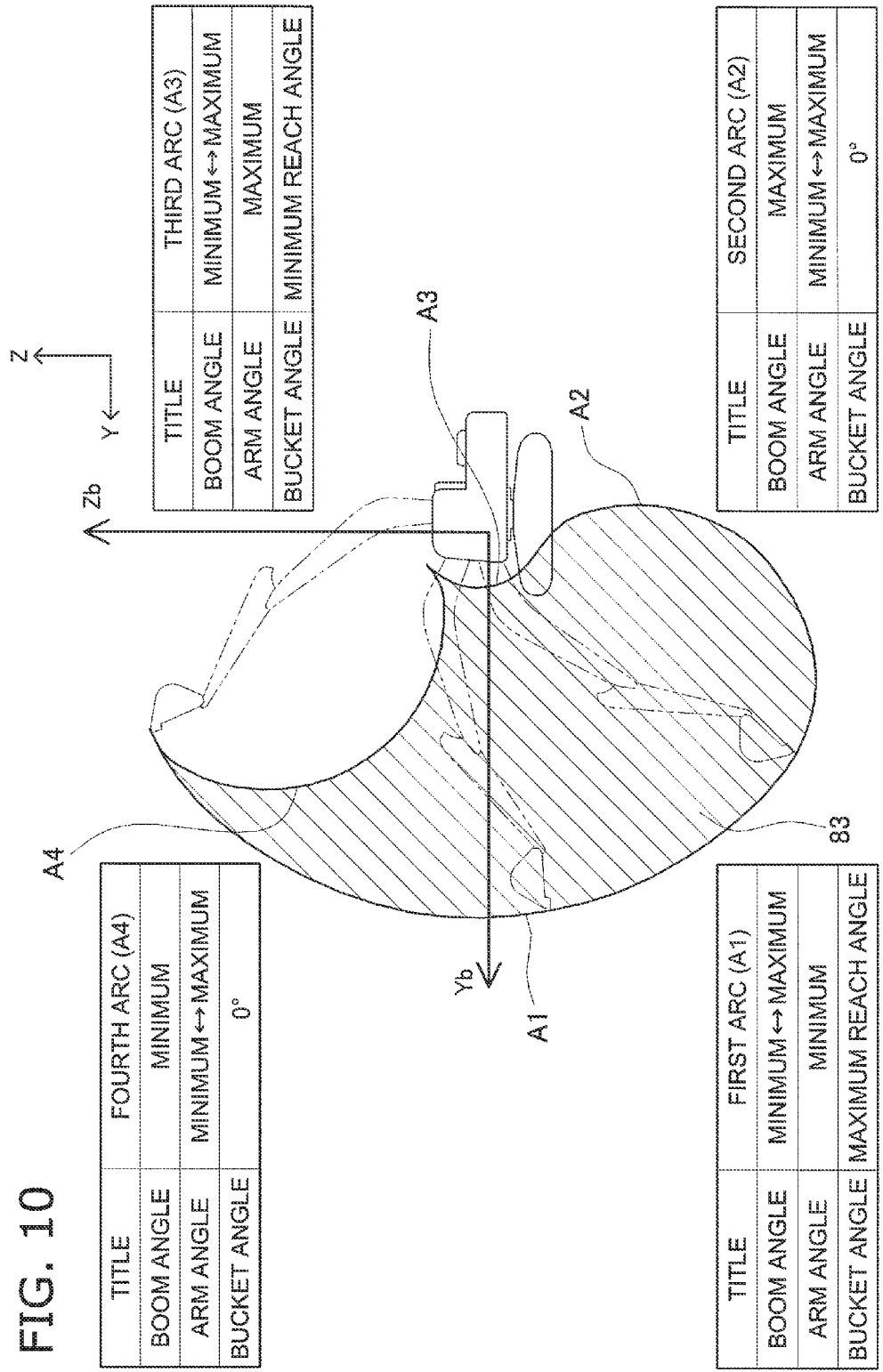
FIG. 10 is an illustration of one example of a reachable range.

In step S3, a reachable range 83 is calculated. As shown in FIG. 10, the reachable range 83 indicates the range that can be reached by the work machine 2. The reachable range 83 is calculated from the work machine data described above and the current position of the main vehicle body 1. The boundary of the reachable range 83 includes a plurality of arcs A1 to A4. For example, the boundary of the reachable range 83 includes a first arc A1 through a fourth arc A4. The first arc A1 is a path traced by the tip of the bucket 8 when the arm angle $\theta 2$ is at the minimum value, the bucket angle $\theta 3$ is at the maximum reach angle, and the boom angle $\theta 1$ varies between the minimum value and the maximum value. The second arc A2 is a path traced by the tip of the bucket 8 when the boom angle $\theta 1$ is at the maximum, the bucket angle $\theta 3$ is at 0°, and the arm angle $\theta 2$ varies between the minimum value and the maximum value. The third arc A3 is a path traced by the tip of the bucket 8 when the arm angle $\theta 2$ is at the maximum value, the bucket angle $\theta 3$ is at the minimum reach angle, and the boom angle $\theta 1$ varies between the minimum value and the maximum value. The fourth arc A4 is a path traced by the tip of the bucket 8 when the boom angle $\theta 1$ is at the minimum, the bucket angle $\theta 3$ is at 0°, and the arm angle $\theta 2$ varies between the minimum value and the maximum value.

Figure 11:
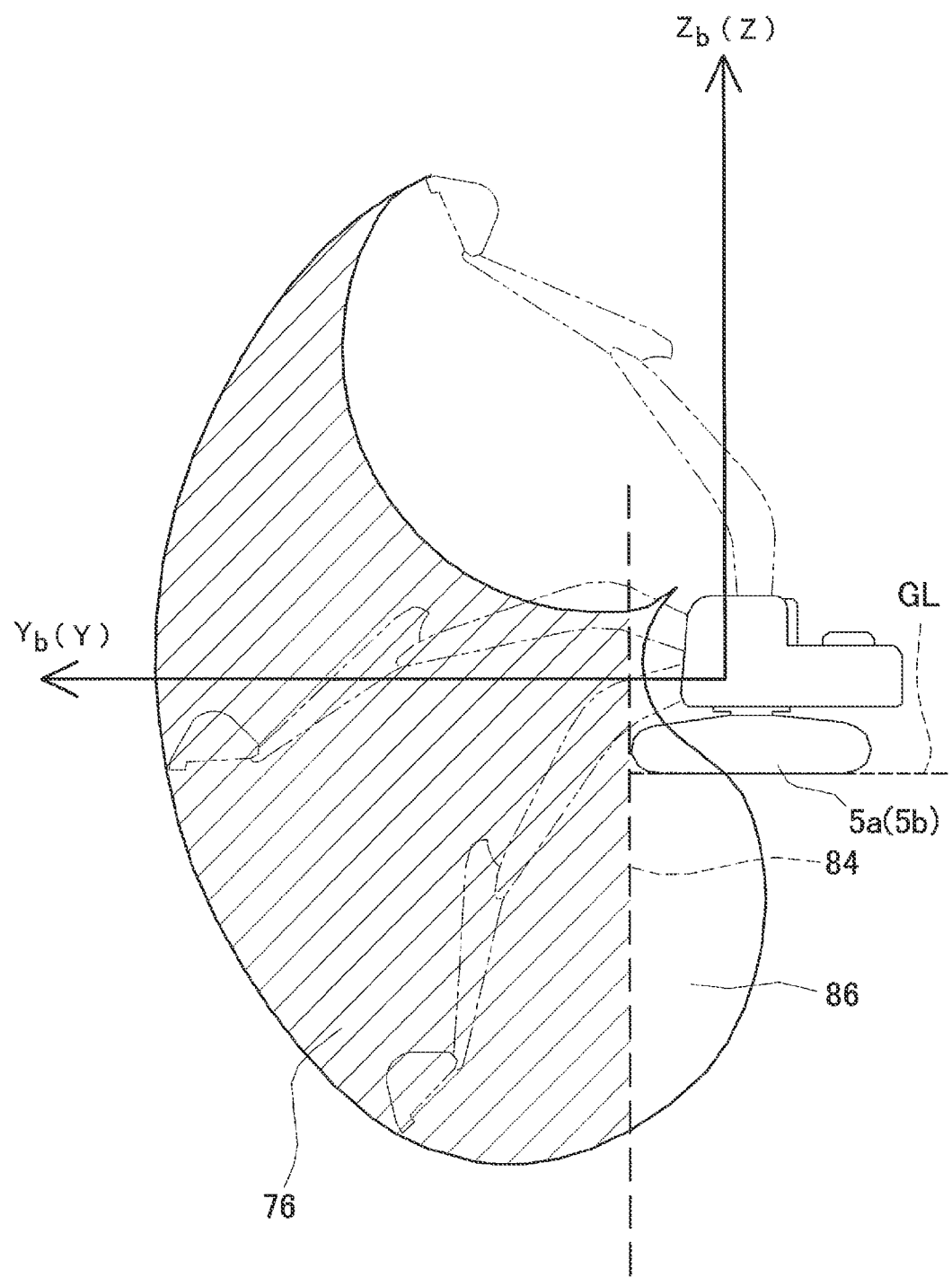
FIG. 11 is an illustration of one example of an operability range when the vehicle body is horizontally oriented.
Figure 12:
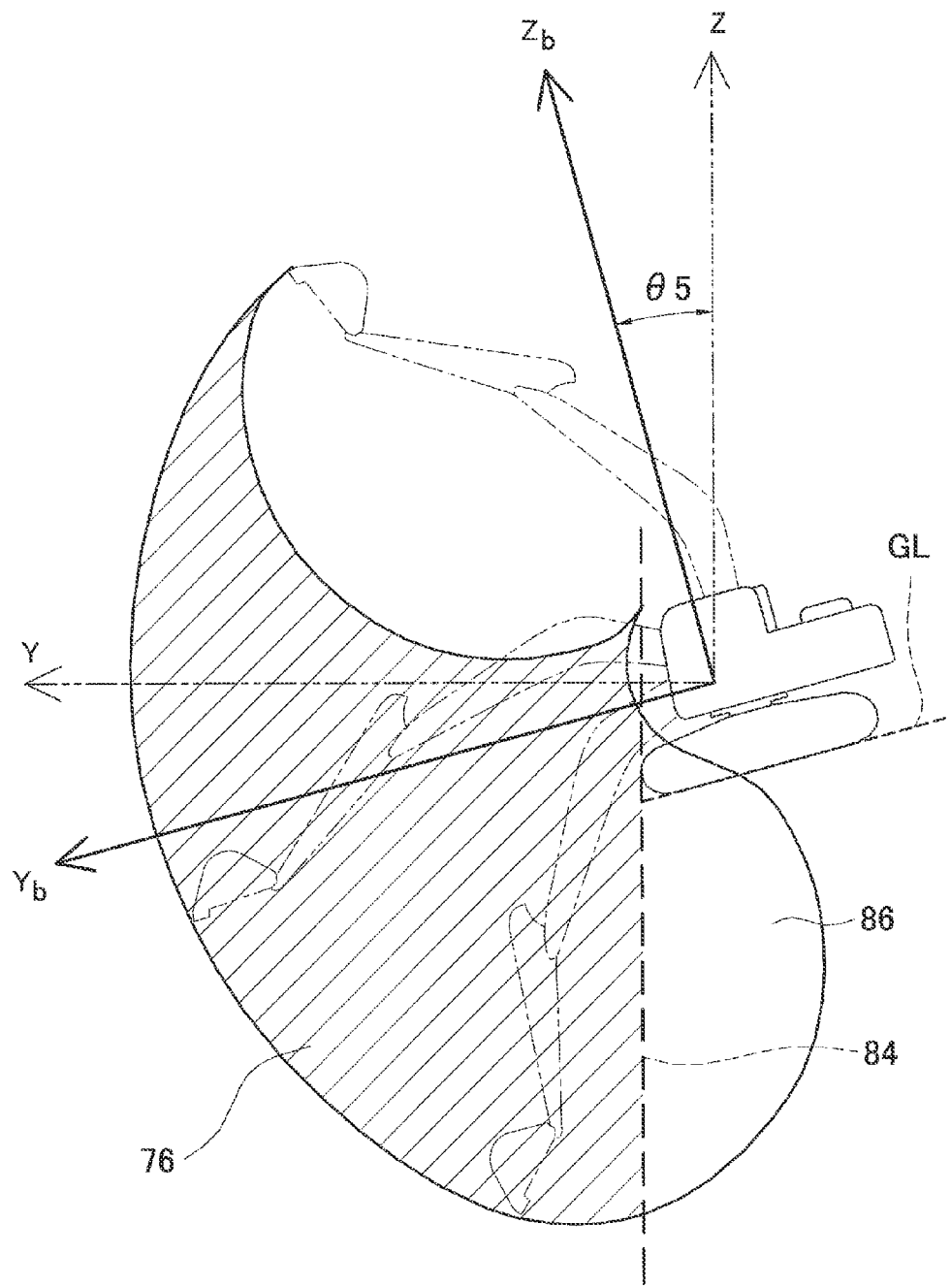
FIG. 12 is an illustration of one example of an operability range when the vehicle body is tilted forward.

In step S4, a boundary 84 is calculated. Specifically, as shown in FIG. 11, a boundary 84 parallel to the vertical direction of the global coordinate system, i.e., the Z-axis, is calculated. Thus, when the main vehicle body 1 is horizontally oriented, the boundary 84 is parallel to the Zb-axis of the main vehicle body coordinate system, and is set so as to pass through the front ends of the tracks 5a, 5b. When the main vehicle body 1 is tilted forward, as shown in FIG. 12, the boundary 84 is set so as to tilt by pitch angle $\theta 5$ with respect to the Zb-axis of the main vehicle body coordinate system.

In step S5, it is determined whether the main vehicle body 1 is horizontally oriented or tilted forward. At this point, it is determined whether the main vehicle body 1 is horizontally oriented or tilted forward, using the detection signal from the inclination angle sensor 24 described above. When the main vehicle body 1 is horizontally oriented or tilted forward, the flow continues to step S7. When the main vehicle body 1 is not horizontally oriented or tilted forward, the flow continues to step S6. In other words, when the main vehicle body 1 is tilted backwards, the flow continues to step S6.

Figure 13:
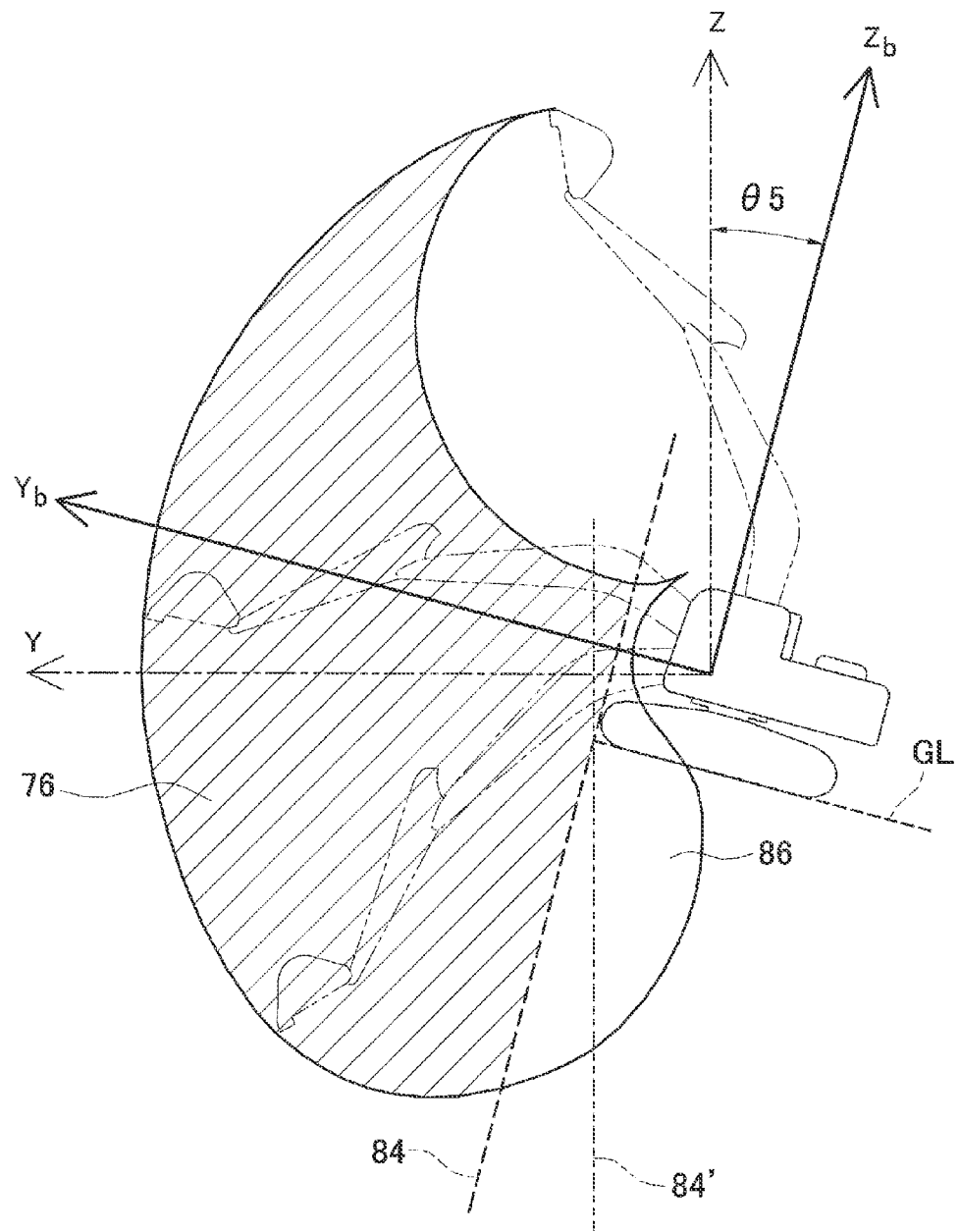
FIG. 13 is an illustration of one example of an operability range when the vehicle body is tilted backward.

In step S6, the boundary 84 is corrected. At this point, the boundary 84 is corrected so that the angle formed by the boundary 84 and the ground surface GL on which the main vehicle body 1 is placed is at least 90°, as shown in FIG. 13. Thus, the boundary 84 is set so as to tilt by pitch angle $\theta 5$ with respect to the Z-axis of the global coordinate system.

In step S7, the operability range 76 is calculated. The operability range 76 is a range in which an underbody area 86 positioned underneath the main vehicle body 1 is excluded from the reachable range 83. Specifically, as the underbody area 86, the part, of the reachable range 83 positioned rearward of the boundary 84 calculated in step 84 through step S6 is excluded from the reachable range 83.

3. Characteristics

In the hydraulic shovel 100 according to the present embodiment, when the main vehicle body 1 is horizontally oriented, as shown in FIG. 11, the boundary 84 of the operability range 76 and the underbody area 86 is set to a direction parallel to the vertical direction in the global coordinate system, i.e., the Z-axis. The boundary 84 is also set so as to be maintained along the vertical direction in the global coordinate system when the main vehicle body 1 is tilted forward, as shown in FIG. 12. Thus, the area positioned underneath the main vehicle body 1 can be kept from being included in the operability range 76 even when the main vehicle body 1 is tilted forward.

Meanwhile, suppose the boundary is set so as to be maintained along the vertical direction in the global coordinate system (cf. chain double-dashed line 84' in FIG. 13) in cases in which the main vehicle body 1 is tilted backwards, as shown in FIG. 13, the angle formed by the boundary 84' and the ground surface GL on which the main vehicle body 1 is positioned would be an acute angle. If digging is performed according to such operability range, the tip of the dug ground surface GL is liable to crumble. Thus, in the hydraulic shovel 100 according to the present embodiment, the boundary 84 is corrected so that the angle formed by the boundary 84 and the ground surface GL on which the main vehicle body 1 is positioned is 90° when the main vehicle body 1 is tilted backwards. This keeps the tip of the dug ground surface GL from forming an acute angle. As described above, the present invention allows an appropriate operability range 76 to be displayed even when the orientation of the main vehicle body 1 is tilted.

4. Other Embodiments

An embodiment of the present invention has been described above, but the present invention is not limited to this embodiment, and a variety of modifications are possible to the extent that they remain within the spirit of the invention. For example, part or all of the functions of the operability range display device 28 may be executed by a computer disposed outside the hydraulic shovel 100. In the embodiment described above, the work machine 2 has a boom 6, an arm 7, and a bucket 8, but the configuration of the work machine 2 is not limited thereto.

In the embodiment described above, the angles of inclination of the boom 6, the arm 7, and the bucket 8 are detected by the first through third stroke sensors 16 to 18, but the means for detecting the angles of inclination is not limited thereto. For example, an angle sensor for detecting the angles of inclination of the boom 6, the arm 7, and the bucket 8 may be provided.

In the embodiment described above, the boundary 84 is corrected so that the angle formed by the boundary 84 and the ground surface GL on which the main vehicle body 1 is positioned is 90° when the main vehicle body 1 is tilted backwards. However, the boundary 84 may also be corrected so that the angle formed, by the boundary 84 and the ground surface GL is an obtuse angle greater than 90°.

Figure 14:
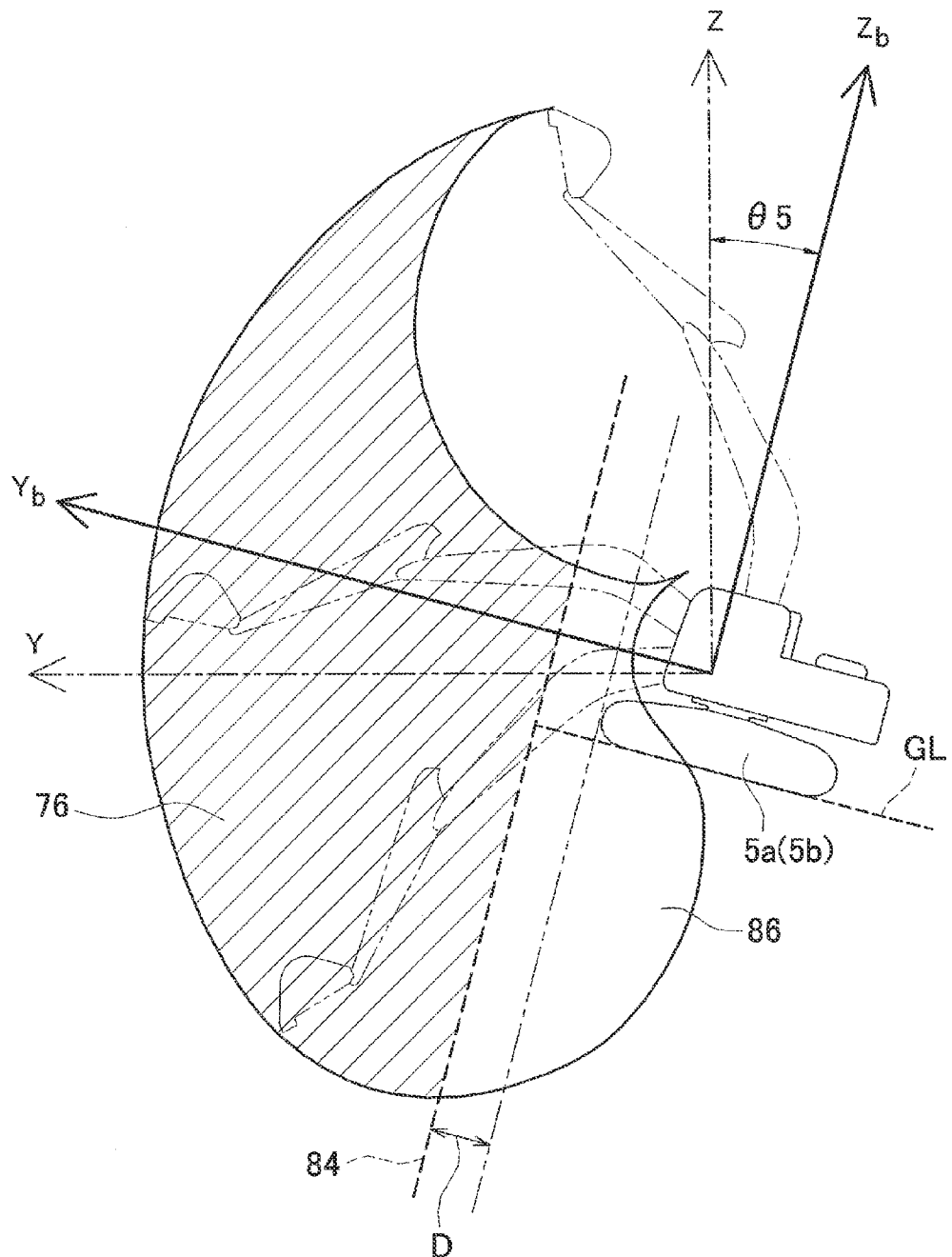
FIG. 14 is an illustration of one example of an operability range in another embodiment.
Figure 15:
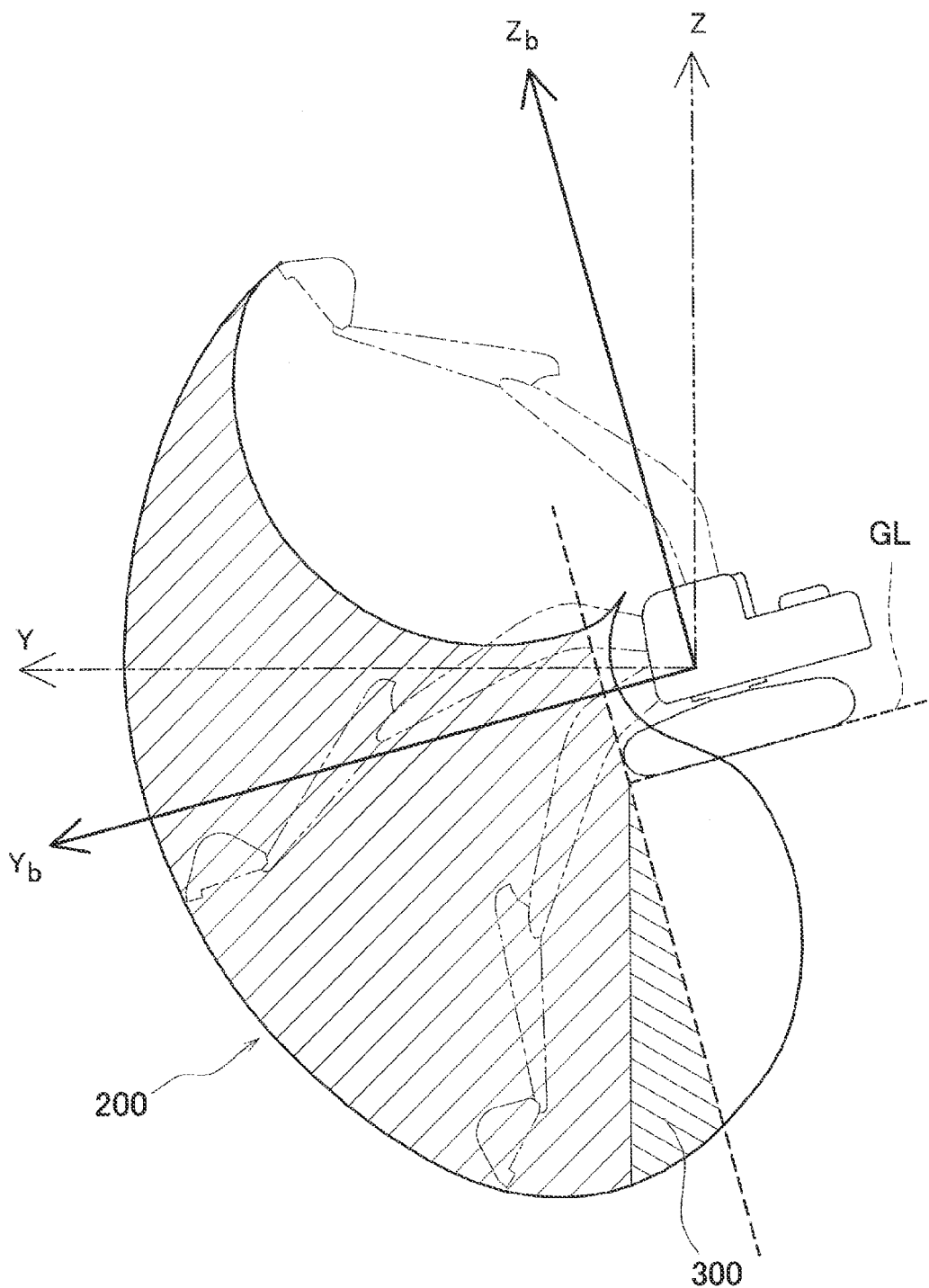
FIG. 15 is an illustration of one example of an operability range when the vehicle body is tilted forward according to the prior art.

In the embodiment described above, the boundary 84 is set so as to pass through the front ends of the tracks 5a, 5b. However, the boundary 84 may also be set so as to pass through a position moved forward as much as a distance D from the front ends of the tracks 5a, 5b, as shown in FIG. 14. In other words, in the present invention, the underbody area is not limited to the area directly underneath the vehicle body, but may also include an area positioned forward of the vehicle body. The underbody area may also include only a part of the area directly underneath the vehicle body, rather than all thereof. In other words, the boundary may be positioned slightly rearward of the tip of the tracks.

The illustrated embodiments can provide a hydraulic shovel operability range display device capable of displaying an appropriate operability range even when the orientation of the vehicle body is tilted.

The invention claimed is:

1. An operability range display device in a hydraulic shovel including a work machine and a vehicle body, the operability range display device comprising:
   a calculation unit configured to calculate an operability range in which an underbody area positioned underneath the vehicle body is excluded from a reachable range indicating a range that can be reached by the work machine; and
   a display unit configured and arranged to display the operability range,
   the calculation unit being configured to set a boundary of the operability range and the underbody area along a vertical direction in a global coordinate system when the vehicle body is horizontally oriented, to set the boundary of the operability range and the underbody area so as to be maintained along the vertical direction in the global coordinate system when the vehicle body is tilted forward, and to correct the boundary of the operability range and the underbody area so that an angle formed by the boundary and a ground surface on which the vehicle body is positioned is at least 90° when the vehicle body is tilted backwards.

2. A method for controlling an operability range display device in a hydraulic shovel including a work machine and a vehicle body, comprising:
   a calculating unit calculating an operability range in which an underbody area positioned underneath the vehicle body is excluded from a reachable range indicating a range that can be reached by the work machine; and
   a display unit displaying the operability range,
   the calculating of the operability range includes setting a boundary of the operability range and the underbody area along a vertical direction in a global coordinate system when the vehicle body is horizontally oriented, setting the boundary of the operability range and the underbody area so as to be maintained along the vertical direction in the global coordinate system when the vehicle body is tilted forward, and correcting the boundary of the operability range and the underbody area so that an angle formed by the boundary and a ground surface on which the vehicle body is positioned is at least 90° when the vehicle body is tilted backwards.

* * * * *